Dec. 23, 1958
D. J. STARK
2,865,920
APPARATUS FOR CONCENTRATION OF LIQUID SOLUTIONS
Filed June 27, 1955
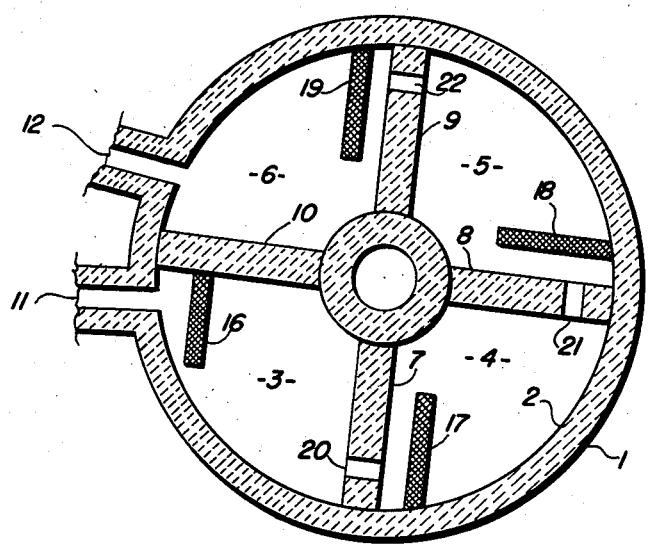
FIG. I
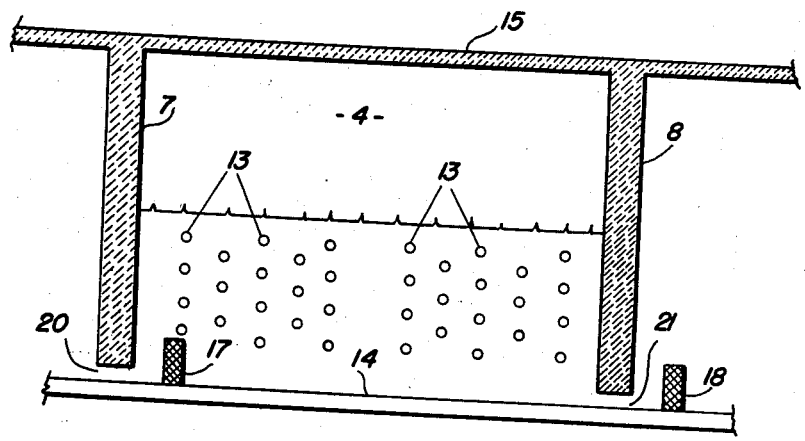
FIG. II
DAVID J. STARK
*INVENTOR.*
BY *Mitchell & Condos*

United States Patent Office 2,865,920
Patented Dec. 23, 1958

2,865,920

APPARATUS FOR CONCENTRATION OF LIQUID SOLUTIONS

David J. Stark, Tuscola, Ill., assignor to National Petro-Chemicals Corporation, New York, N. Y., a corporation of Delaware Application June 27, 1955, Serial No. 517,977

2 Claims. (Cl. 23—276)

The present invention relates to a method and apparatus for treatment of liquid solutions, such as aqueous solutions of mineral acids, and particularly for concentration in improved manner of aqueous solutions of mineral acids such as sulfuric acid.

In numerous industrial processes utilizing aqueous solutions of mineral acids, such as sulfuric acid, of relatively high acid strength, acid solutions are obtained in the form of aqueous solutions of relatively lower acid strength. Hence, for reuse in such processes, or for other usages wherein an acid solution of relatively higher acid concentration is required, the relatively weak acid solution is normally subjected to treatment to remove water and thus provide a more concentrated acid solution. For example, in the use of a relatively concentrated sulfuric acid solution (e. g., from about 60 to about 98% acid) in olefin hydration processes for production of alcohols wherein a suitable olefin (e. g., ethylene) is subjected to absorption with relatively strong sulfuric acid to form an extract of alkyl esters, the extract is normally steam stripped to recover olefin hydration products whereby a relatively weak sulfuric acid solution (e. g., about 50% acid) is obtained. Though such relatively weak acids are valuable materials due to their acid content, they are materially enhanced in value and utility upon concentration to a solution of higher acid content as, for example, to an acid strength of about 78% for use in fertilizer manufacture or to still more concentrated solutions for use in olefin hydration processes, and the like.

For concentration of such relatively weak solutions of sulfuric acid, certain methods and apparatus are available for removal of water by subjecting the weak solutions to conditions of temperature and, if necessary or desired, to low pressure, whereby water is evaporated from the acid solution to the extent required to provide a solution of desired acid concentration. To accomplish concentration in this manner, the relatively weak acid solution may be subjected to contact with suitable heating surfaces, using steam coils, tubes, etc., whereby, such as by indirect heat exchange, the temperature of the solution is raised to the extent sufficient to concentrate the solution by evaporation of water therefrom. Generally, however, and in instances wherein it is desired to concentrate a relatively weak acid solution to a substantially concentrated solution, the relatively weak acid is subjected to a series of such heat treatments with the acid solution generally becoming progressively more concentrated as it passes from stage to stage and with conditions of temperature, pressure, etc., in each stage being controlled depending upon the acid concentration of the solution treated therein and the extent of concentration it is desired to effect in the particular stage. In concentration of the acid solutions by contacting the solutions with heating surfaces as aforesaid, it is desirable that concentration of the acid solution be effected with minimized fouling of the heating surfaces and minimized by-passing of the heating surfaces by the acid solution being concentrated to obtain increased film heat transfer coefficients. The primary object of the present invention is to provide a method and apparatus adapted for concentration of liquid solutions such as aforediscussed in improved manner with minimization of fouling of heating surfaces, reduced by-passing of heating surfaces by the liquid solution being concentrated, and with marked increase in film heat transfer coefficient.

In accordance with this invention, concentration of a liquid solution is effected in improved manner by passing the liquid solution through a plurality of heat treating zones, each of which is provided with heating surfaces for indirect heat exchange with the liquid solution to be concentrated, and controlling the direction of flow of liquid solution entering each of said zones with respect to the heating surfaces to be contacted by the liquid solution in each zone. More specifically, in accordance with this invention, the liquid to be concentrated is passed through a plurality of treating zones in series, each of which zones contains a heating surface or surfaces disposed at an elevation above the bottom portion of each zone, controlling withdrawal of concentrated solution from the last of said zones so that the heating surfaces in each zone are maintained submerged in liquid solution being concentrated in each zone, said flow of liquid from zone to zone being at an elevation below the surface level of liquid in each zone, and controlling the direction of flow of liquid entering each of said zones into contact with the heating surfaces in each zone in a manner whereby fouling and by-passing of heat transfer surfaces is minimized with obtainment of a markedly increased film heat transfer coefficient.

In order to further describe the invention with respect to its method and apparatus aspects, but without intent that the invention be limited thereto, reference is made to the accompanying drawings in which Figure I is a plan view of an apparatus suitable for carrying out the invention, and Figure II shows certain elements of the apparatus of Figure I to facilitate description thereof.

In Figure I, cylindrical vessel 1, a steel tank innerlined with lead and refractory brick 2, is divided into a series of compartments 3, 4, 5 and 6 by vertical brick partitions 7, 8, 9 and 10, respectively, in a manner whereby partition 7 is common to compartments 3 and 4, partition 8 is common to compartments 4 and 5, partition 9 is common to compartments 5 and 6, and partition 10 is common to compartments 3 and 6. At a lower portion of the outer wall of compartment 3, and at an elevation below the uppermost of steam heating tubes 13 in compartment 3, an opening 11 is provided for introduction into compartment 3 of liquid solution to be subjected to concentration, and in an upper portion of the outer wall of compartment 6, and at an elevation above the uppermost of heating surfaces in compartment 6, an opening 12 is provided for overflow of concentrated acid from compartment 6, the elevated position of outlet 12 serving to control the liquid level in each compartment whereby the heating surfaces in each compartment are maintained immersed in liquid solution. In the lower portion of each of partitions 7, 8 and 9, a suitable opening 20, 21 and 22 respectively, is provided for passage of liquid from one compartment to the succeeding compartment. In each compartment a heating surface, or plurality of such surfaces, illustrated by torpedo heating tubes 13, are disposed at an elevation above the bottom 14 of each compartment, whereby liquid solution in each compartment is heated by contact with the heating surface to desired temperature for effecting the desired degree of concentration by evaporation of water in each compartment. Vessel 1 is provided with a top 15 which is preferably provided with a suitable opening or openings (not shown) for each of the compartments whereby water evaporated in each compartment is withdrawn as vapor and, if desired, passed to a condenser for recovery of entrained acid that may be carried out of the compartment by the water vapor. In accordance with this invention, suitable means such as baffle elements 16, 17, 18 and 19 are provided in compartments 3, 4, 5 and 6 respectively, in a manner whereby liquid solution entering each compartment through underflow openings 20, 21 and 22 respectively, is subjected to change in direction of flow whereby the liquid solution flows upwardly to impinge upon the heat transfer surfaces. To effect such a change of flow and provide the improved results embodied herein, the baffle elements, which may be composed of acid resistant brick, are rigidly adhered to the bottom of each compartment and each baffle, with respect to its surface area facing the particular acid inlet which it accommodates, is sufficiently larger than the diameter of the inlet and is so disposed with respect to the inlet that all or substantially all of the liquid solution passing through the inlet is subjected to change of directional flow by the baffle element whereby the liquid solution impinges on heat surfaces disposed in the particular compartment. In preferred aspect, the baffle means in each compartment extends from the outer wall of the compartment to a point past the acid inlet to the compartment as is shown in Figure I, and, as also shown, each baffle is preferably substantially parallel to the partition containing the particular acid inlet which the baffle accommodates. Although such disposition of the baffle elements with respect to the partition openings which they accommodate represents a preferred embodiment, it should be understood that other than a substantially parallel arrangement may be employed as long as the arrangement provides the change of directional flow adequate for providing the improved results embodied by the invention.

In practice of the invention as embodied herein and with use of an apparatus as illustrated in the drawing, liquid solution to be concentrated is passed into compartment 3 via opening 11 at a defined velocity, correlated with the rate of withdrawal from overflow opening 12 in compartment 6 and the liquid evaporated and removed as vapor from each compartment, such that in each compartment the liquid level is maintained below the top of each compartment but above the heating surfaces in each compartment. By disposition of baffle means adjacent to the inlet to each compartment as shown to direct flow of liquid into contact with the heating surfaces, by-passing of the heat surfaces is avoided in apparatus of the underflow type as aforedescribed. Since the acid solution is introduced at a relatively high feed rate into an apparatus of the type described and flow of solution into each compartment is directed to the outlet from each compartment, in absence of the described baffle elements the solution tends to by-pass the heat transfer surfaces, thereby flowing through the concentrator with little or no concentration of the by-passing acid, resulting in introduction into a succeeding compartment of acid that has not undergone substantial, if any, concentration in the preceding compartment. By use of the baffle means specially disposed with respect to the acid inlets and heating surfaces in each compartment, by-passing is avoided, increased acid flow past the heat transfer surfaces occurs resulting in reduced fouling of heat transfer surfaces, and a substantial increase in film heat transfer coefficient is obtained.

In a specific embodiment, the invention was carried out using an apparatus, as illustrated in Figure I, in which vessel 1 was a cylindrical tank, as aforedescribed, 23′ 8″ in height and 15′ 2″ in diameter. The tank was partitioned into four compartments by means of vertical brick partitions 7, 8, 9 and 10 with partitions 7, 8 and 9 each having an opening (6″, I. D.) in the lower portion of each partition. Acid inlet 11, also 6″, I. D., was provided in the outer wall of compartment 3 at a lower portion of said wall and, in the outer wall of compartment 6, an overflow outlet (6″, I. D.) was provided at an elevation such that a liquid level of 5′ 10″ was maintained in compartment 6, whereby the surface level of liquid in each of the series of compartments was at an elevation sufficient to maintain the heating surfaces (banks of steam torpedo tubes) in each compartment immersed in liquid solution undergoing concentration. By operation of the apparatus for concentration of aqueous solutions of from about 78 to 81% acid strength to solutions of about 84% acid, an average increase of 102% in heat transfer coefficient was obtained by provision in the apparatus of baffle elements 16, 17, 18 and 19 in the manner described hereinbefore and illustrated in the drawings, thus illustrating the improvement resulting from practice of the invention in which the acid solution introduced into each of the series of compartments is controlled with respect to direction of flow so as to impinge on heat transfer surfaces in the compartments and minimize undesirable by-passing of the heat surfaces by liquid solution undergoing concentration.

While there are above disclosed but a limited number of embodiments of the invention herein presented, it is possible to produce still other embodiments without departing from the inventive concept herein disclosed, and it is desired therefore that only such limitations be imposed on the appended claims as are stated therein.

What is claimed is:

1. An apparatus, adapted for concentration of liquid solutions, comprising a vertically elongated vessel vertically partitioned into a plurality of compartments, a heating surface in each of said compartments, said heating surface being positioned at an elevation above the bottom but below the top of the compartment, inlet means in the first of said compartments for introduction of liquid into a lower portion of said first compartment, means in the lower portion of all but the last of said compartments for passage of liquid from each compartment, outlet means in the last of said compartments for withdrawal of liquid from said last compartment, said outlet means being positioned at an elevation above the heating surface in said last compartment, and baffle means in each of said compartments positioned with respect to the inlet means to each compartment to direct liquid introduced into each compartment into contact with the heating surface in that compartment.

2. An apparatus, adapted for concentration of liquid solutions, comprising a cylindrical vessel vertically partitioned into a plurality of compartments, each of which compartments contains a heating surface positioned at an elevation above the bottom of each compartment but below the top of each compartment, inlet means in the first of said compartments for the introduction of liquid into a lower portion of said first compartment, means in the lower portion of all but the last of said compartments for passage of liquid from each compartment to its succeeding compartment, outlet means in the last of said compartments for withdrawal of liquid from said last compartment, said outlet means being positioned at an elevation above the heating surface in said last compartment, and baffle means in each of said compartments positioned with respect to the inlet means in each compartment to direct liquid introduced into each compartment into contact with the heating surface in each compartment.

References Cited in the file of this patent
UNITED STATES PATENTS

| | | |
|---|---|---|
| 453,801 | Ackerson | June 9, 1891 |
| 1,253,616 | McElroy | Jan. 15, 1918 |
| 1,294,827 | Patten | Feb. 18, 1919 |
| 2,702,233 | Mitchell et al. | Feb. 15, 1955 |

FOREIGN PATENTS

| | | |
|---|---|---|
| 697,884 | France | Nov. 5, 1930 |
| 390,634 | Great Britain | Apr. 13, 1933 |